с

US010050981B2

(12) United States Patent
Kishinevsky et al.

(10) Patent No.: US 10,050,981 B2
(45) Date of Patent: Aug. 14, 2018

(54) ATTACK DETECTION THROUGH SIGNAL DELAY MONITORING

(71) Applicant: Intel Corporation, Santa Clara, CA (US)

(72) Inventors: Eugene Kishinevsky, Hillsboro, OR (US); Siddhartha Chhabra, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/703,609

(22) Filed: May 4, 2015

(65) Prior Publication Data

US 2016/0330216 A1    Nov. 10, 2016

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |

(52) U.S. Cl.
CPC ...... *H04L 63/1416* (2013.01); *H04L 63/1441* (2013.01)

(58) Field of Classification Search
CPC .................. H04L 63/1416; H04L 63/1441
USPC ........................................................ 726/23
See application file for complete search history.

(56) References Cited

U.S. PATENT DOCUMENTS

| 7,555,787 B2 | 6/2009 | Clercq |
| 7,574,314 B2 | 8/2009 | Ford et al. |
| 8,378,710 B1* | 2/2013 | Al-Kadi ............ G06K 19/07372 326/15 |
| 2003/0099321 A1* | 5/2003 | Juan ........................ H03L 7/07 375/376 |

(Continued)

FOREIGN PATENT DOCUMENTS

WO    2005011195 A2    2/2005

OTHER PUBLICATIONS

Miron Abramovici; Integrated Circuit Security—New Threats and Solutions; Apr. 13-15, 2009; ACM 978-1-60558-518-5; p. 1-3.*

(Continued)

*Primary Examiner* — Monjour Rahim
(74) *Attorney, Agent, or Firm* — Grossman, Tucker, Perreault & Pfleger, PLLC

(57) ABSTRACT

The present disclosure is directed to attack detection through signal delay monitoring. An example system may comprise at least one device including a physical interface. At least one signal delay monitor may determine whether a signal being transmitted to the device is received as expected at the physical interface and indicate a potential attack when the signal is determined to not be received as expected. Determining whether the signal is received as expected may include determining whether the signal is received within a window defining a time period in which receipt of the signal is expected. An example signal monitor may comprise at least a new data reception monitoring module and an expected reception window monitoring module. These modules may include logic to determine whether the signal is received within the window. An indication of a potential attack may trigger, for example, security-related actions in the system.

12 Claims, 5 Drawing Sheets

(56) References Cited

U.S. PATENT DOCUMENTS

| | | | | |
|---|---|---|---|---|
| 2009/0065592 A1* | 3/2009 | Paul | ............... | G06F 21/77 |
| | | | | 235/492 |
| 2010/0316142 A1* | 12/2010 | Tsuchiya | ............ | G06K 17/5045 |
| | | | | 375/259 |
| 2011/0289593 A1* | 11/2011 | Deas | ............ | H04L 7/0008 |
| | | | | 726/26 |
| 2012/0133511 A1 | 5/2012 | Blum | | |
| 2013/0044003 A1* | 2/2013 | Eguro | ............ | G06F 21/86 |
| | | | | 340/653 |
| 2013/0312122 A1* | 11/2013 | Arora | ............ | G06F 21/558 |
| | | | | 726/34 |
| 2015/0120085 A1* | 4/2015 | Sanji | ............ | B60R 25/24 |
| | | | | 701/1 |

OTHER PUBLICATIONS

International Search Report and Written Opinion issued in corresponding PCT Application No. PCT/US2016/025997, dated Jul. 13, 2016.

International Preliminary Report on Patentability and Written Opinion issued in PCT Application No. PCT/US2016/025997, dated Nov. 16, 2017, 11 pages.

* cited by examiner

ATTACK DETECTION THROUGH SIGNAL DELAY MONITORING

TECHNICAL FIELD

The present disclosure relates to system security, and more particularly, to detecting an attack by monitoring for delays in signal reception based on, for example, a reception window.

BACKGROUND

The modern reliance on electronic devices for conducting daily transactions has resulted in growing concern regarding device security. For example, in the course of daily use electronic devices may receive, store, transmit, confidential data such as authentication data, account access data, account numbers, personal identification data, residence data, etc. This type of data may be useful to persons with questionable intentions such as identity theft, gaining unauthorized access to accounts, deriving personal or commercial advantage through the acquisition of confidential data, etc. A variety of software and/or hardware-based protective measures have been devised to protect against these attacks. Software-based virus and/or firewall protection may defend against common computer viruses, hoaxes, Trojan horses, etc. However, these protective measures may be limited to operating at the same privilege level as the operating system (OS) in a device. The ingenuity of attackers has allowed them to circumvent the defenses by, for example, introducing malicious software (e.g., malware) much earlier in the boot process of a device. This variety of malware (e.g., a rootkit) may attack a device when in a vulnerable state, and thus may be able to incorporate itself into the operational code of the device in a manner granting high privilege, and thus protection from lower privilege defenses.

To protect against low level attacks, developers have begun to incorporate protection into the hardware of the device. For example, the boot process may be protected via trusted activities in which known-good programs are equipped to verify the integrity of later-loaded software. In addition, processors and processing chipsets may be equipped with encryption features that may protect applications and data while stored in memory. The contents of the data may be protected by encryption, and in some instances the integrity of the encrypted data may further be verifiable prior to decryption to ensure that an attacker did not alter the encrypted data. While the benefits of such protections are apparent, each advancement in protection may be accompanied by a new form of attack. For example, existing hardware protection may not be tailored to combat attacks wherein an attacker may physically access hardware and/or alter hardware operation in a device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
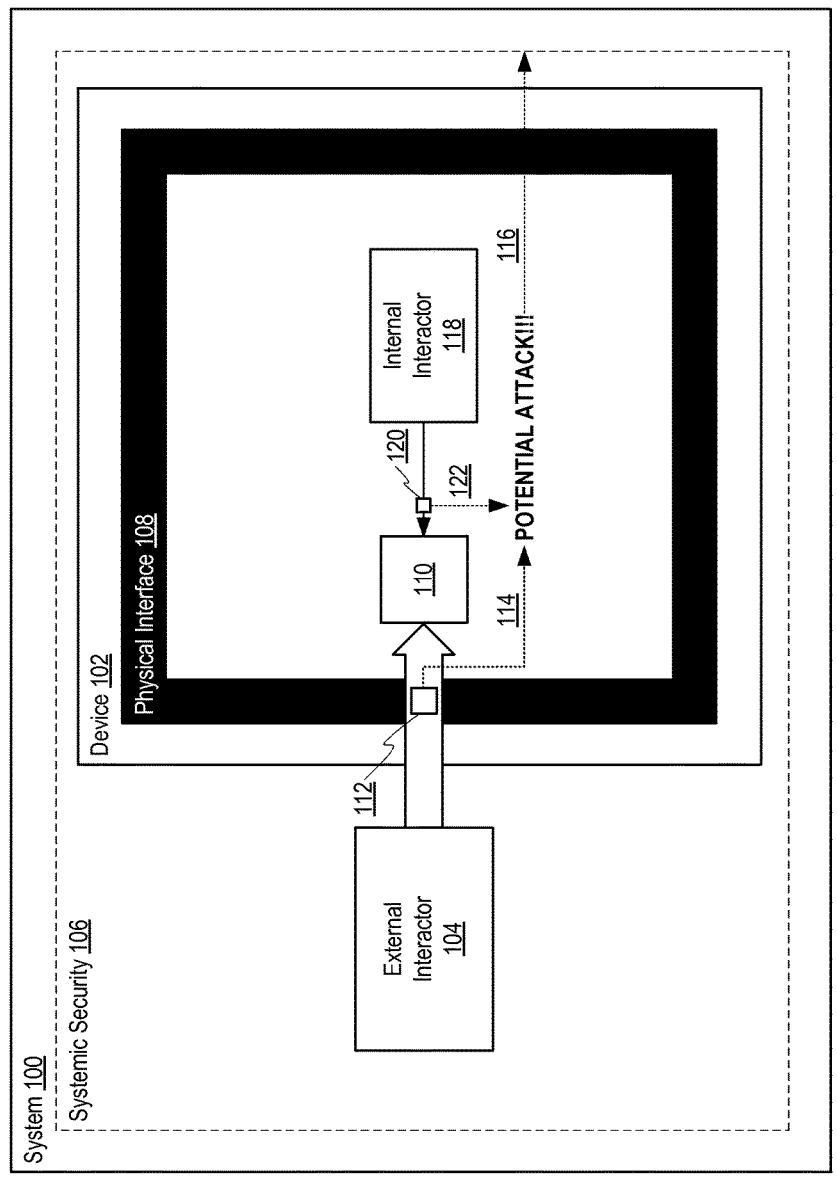
FIG. 1 illustrates an example system equipped for attack detection through signal delay monitoring in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to attack detection through signal delay monitoring. In at least one embodiment, a system may comprise various protective measures including at least signal delay monitoring. For example, a device in the system may comprise a physical interface including at least one signal delay monitor. The signal delay monitor may determine whether a signal being transmitted to the device is received as expected at the physical interface, and may indicate a potential attack when the signal is determined to not be received as expected. In at least one embodiment, determining whether the signal is received as expected may include determining whether the signal is received within a window defining a time period in which receipt of the signal is expected. The signal monitor may comprise at least a new data reception monitoring module and an expected reception window monitoring module. These modules may include logic that determines whether the signal is received within an expected reception window defined by a tuned pulse. In at least one embodiment, the indication of a potential attack may cause systemic security also protecting the system to perform at least one security-related action.

In at least one embodiment, an example device equipped for attack detection through signal delay monitoring may comprise a physical interface and at least one signal delay monitor. The at least one signal delay monitor may be included in, or at least coupled to, the physical interface, may determine whether a signal being transmitted to the device is received as expected at the physical interface, and may indicate a potential attack when the signal is determined to not be received as expected.

In determining whether the signal is received as expected the signal monitor may be to determine whether the signal is received within a window defining a time period in which receipt of the signal is expected. The at least one signal delay monitor may comprise, for example, at least a new data reception monitoring module and an expected reception window monitoring module. The new data reception module may comprise logic enabled by a system clock to compare a state of a data input in the physical interface to a previous state of the data input to determine if new data has been received at the data input. The expected reception window monitoring module may comprise logic enabled by a window clock to determine if the state of the data input changes during the expected reception window. The expected reception window may be determined based on the window clock. For example, the window clock may be a tuned pulse clock. In indicating a potential attack the signal monitor may be to set a fault bit based on logic that performs a logical AND on an output of the new data reception monitoring module and an output of the expected reception window monitoring module.

In at least one embodiment, the device may further comprise at least one internal signal delay monitor to determine whether a signal being transmitted within the device is received as expected in the device, and indicate a potential attack when the signal is not received as expected. Consistent with the present disclosure, an example system equipped for attack detection through signal delay monitoring may comprise at least one device including a physical interface and at least one signal delay monitor included in, or at least coupled to, the physical interface, wherein the at least one signal monitor is to determine whether a signal being transmitted to the device is received as expected at the physical interface, and indicate a potential attack when the signal is not received as expected, at least one interactor external to the at least one device to transmit the signal, and systemic security to at least monitor for the at least one signal delay monitor to indicate a potential attack. In determining whether the signal is received as expected the signal monitor may be to determine whether the signal is received within a window defining a time period in which receipt of the signal is expected. The signal monitor may comprise, for example, at least a new data reception monitoring module and an expected reception window monitoring module. The systemic security may be to perform at least one security-related action based on determining that the signal monitor has indicated a potential attack. Consistent with the present disclosure, an example method for attack detection through signal delay monitoring may comprise determining that a state of a system clock enables the reception of data in a device, determining at a physical interface in the device whether new data is received and determining in at least one signal delay monitor included in, or at least coupled to, the physical interface whether the new data is received as expected based on a determination that new is received at the device.

FIG. 1 illustrates an example system equipped for attack detection through signal delay monitoring in accordance with at least one embodiment of the present disclosure. Initially, the following disclosure may make reference to a variety of security technologies such as Software Guard Extensions (SGX) developed by the Intel Corporation, the components that may make up SGX and the manner in which SGX may operate. SGX has been referenced herein to provide a readily comprehensible perspective for understanding the various disclosed embodiments, and is not intended to limit implementations to only employing SGX.

An example configuration for system 100 is shown in FIG. 1. Examples of system 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Example system 100 may comprise, inter alia, device 102 and external interactor 104 that may be protected by systemic security 106. Device 102 may be a solitary integrated circuit (IC) such as a system-on-chip (SOC), a multichip module (MCM), a group of separate ICs designed to operate collaboratively (e.g., a chipset), etc. For example, device 102 may include processor cores or features supporting a processor chipset. External interactor 104 may include any other subsystem in system 100, examples of which are illustrated and explained in regard to FIG. 2.

Systemic security 106 may protect system 100 from a variety of attacks that may seek to gain unauthorized access to system 100, and more particularly to data stored in system 100. To guard against these attacks, systemic security 106 may comprise software-based protections, hardware-based protections and protection solutions that combine both hardware and software components. For example, traditional software-based virus/firewall measures may be bolstered with hardware-based defenses like SGX to protect at least a portion of the memory in system 100. SGX may provide a secure, hardware-encrypted computation and storage area within system memory, the contents of which cannot be deciphered by privileged code or even through applying hardware probes to memory bus. When memory is protected by SGX it is impossible for intruders to read the contents of the secure area. Protected data cannot be observed outside of SGX, and thus, is inaccessible outside of SGX. In particular, the identity of programs (e.g., based on cryptographic hash measurements of each program's contents) may be signed and stored inside each program. When the programs are then loaded, a processor in system 100 (e.g., device 102) may verify that a current measurement of the program is identical to a measurement previously embedded inside the program. The signature used to sign the embedded measurement is also verifiable because the processor may be provided with a public key used to verify the signature at program load time. Malware cannot tamper with a protected program because its measurement would also be altered. Malware also cannot spoof the signature because the signing key is secure with the program's author. While the various embodiments disclosed herein may work in conjunction with systemic security 106 such as SGX, consistent with the present disclosure, other security technologies existing now or developed in the future may also be used.

While systemic security 106 may help to protect system 100 from attacks, some attackers may seek to exploit weaknesses that are not well-defended by existing protective measures. For example, some hardware-based exploits avoid software hacks and seek to alter the functioning of the hardware itself. In "probing" physical probes may be attached to a wire, motherboard trace, connector, etc. to measure and/or modify the signals being transmitted. "Module swaps" may include removing and replacing equipment (e.g., modules, chips, components, etc.) in system 100 with equipment that may allow an attacker to intercept, modify and/or replace signals, which may allow the attacker to gain unauthorized access to data, gain control over system 100, etc. An attacker may also lower or raise the power supplied to different subsystems in system 100, or may suddenly raise or lower the power supply in short bursts (e.g., "glitch"), to cause system 100 to behave in unexpected ways. For example, an attacker may glitch the power supply to cause bits to flip in an unexpected manner, which may trigger a course of events allowing the attacker to gain control over system 100. While the above attacks may be utilized to circumvent systemic security 106, the manner in which they are able to overcome existing protection schemes creates a traceable footprint in that the above attacks also alter the characteristics of signal transmission in system 100. The various embodiments described herein attempt to exploit this behavior, and may be used in conjunction with systemic security 106 to enhance the protection of system 100.

In an example of operation, at least external interactor 104 may transmit signals to device 102 via physical interface 108, and in particular to component 110 (e.g., processing core) within device 102. At least one signal delay monitor 112 may be included in, or at least coupled to, physical interface 108. For example, if physical interface 108 comprises various inputs (e.g., pins, pads, contacts, etc.) through which signals are transmitted from and received into device 102, then there may be signal delay monitors 112 corresponding to each input, a signal delay monitor 112 corresponding to a plurality of inputs (e.g., in a logic-coordinated or multiplexed arrangement), etc. In at least one embodiment, signal delay monitor 112 may determine whether a signal being transmitted to device 102 is received as expected at physical interface 108, and may indicate a potential attack when the signal is determined to not be received as expected (e.g., which may be indicative of one of the above hardware-based attacks). Determining whether the signal is received as expected may include, for example, determining whether the signal is received within a window defining a time period in which receipt of the signal is expected. If a signal is determined to be received outside of (e.g., before or after) the window, signal delay monitor 112 may indicate the potential attack as shown at 114. In at least one embodiment, the indication may be observed by, or reported to, systemic security 106 as shown at 116, which may respond by performing at least one security-related action. Security-related actions may include, but are not limited to, causing some or all of system 100 to enter a maximum protection or lock down mode wherein sensitive data is unloaded from device 102, encrypted and stored in a secure part of the memory in system 100, may cause subsystems in system 100 to halt operation until unlocked by an authorized user, system manufacturer, etc., may cause an alert message to be transmitted to a user mobile communication system or third-party monitoring service, etc. Signal delay monitor 112 may monitor inter-device signals received from external interactor 104. In a similar manner, signal delay monitor 120 may monitor intra-device signals transmitted within device 102. For example, internal interactor 118 may transmit a signal to component 110. If the signal is not received as expected then signal delay monitor 120 may indicate a potential attack as shown at 122 that may cause systemic security 106 to perform a security-related action.

Figure 2:
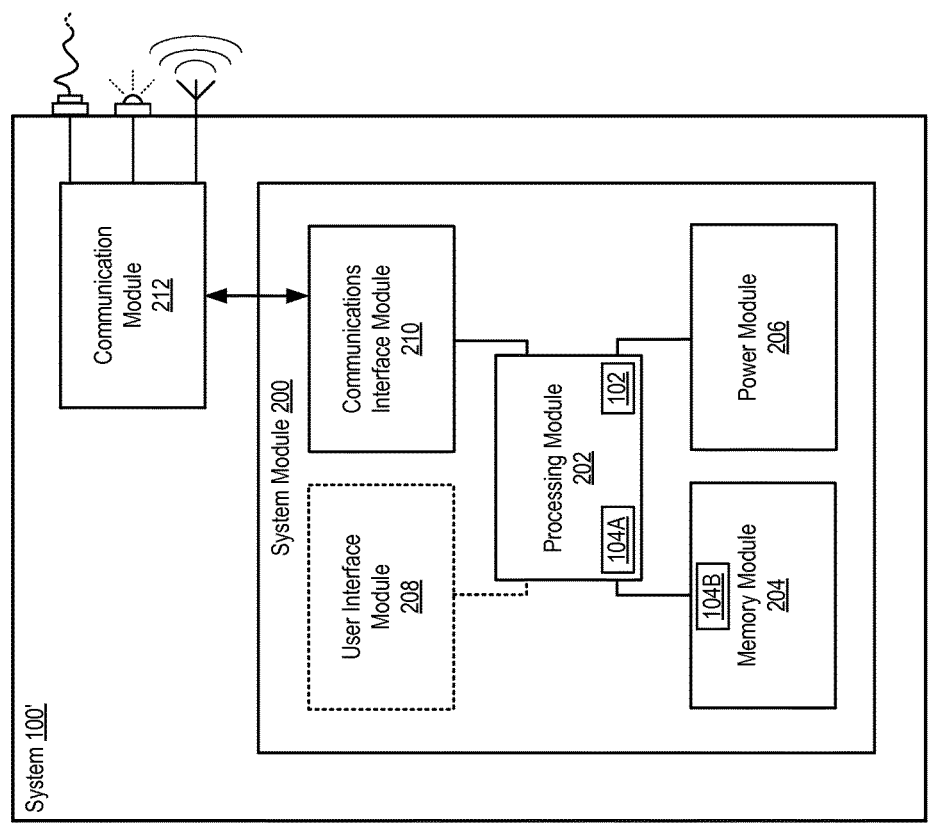
FIG. 2 illustrates an example configuration for a system usable in accordance with at least one embodiment of the present disclosure.

FIG. 2 illustrates an example configuration for a system usable in accordance with at least one embodiment of the present disclosure. The inclusion of an apostrophe after an item number (e.g., 100') in the present disclosure may indicate that an example embodiment of the particular item is being illustrated. For example, system 100' may be capable of performing any or all of the activities disclosed in FIG. 1. However, system 100' is presented herein only as an example of an apparatus usable in embodiments consistent with the present disclosure, and is not intended to limit any of the various embodiments to any particular manner of implementation.

System 100' may comprise, for example, system module 200 to manage operation of the device. System module 200 may include, for example, processing module 202, memory module 204, power module 206, user interface module 208 and communication interface module 210. System 100' may further include communication module 212. While communication module 212 is illustrated as separate from system module 200, the example configuration shown in FIG. 2 has been provided herein merely for the sake of explanation. Some or all of the functionality associated with communication module 212 may also be incorporated into system module 200.

In system 100', processing module 202 may comprise one or more processors situated in separate components, or alternatively one or more cores in a single component (e.g., in an SOC configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in system 100'. Moreover, some or all of the functionality commonly associated with the support circuitry may also be included in the same physical package as the processor (e.g., such as in the Sandy Bridge family of processors available from the Intel Corporation). Consistent with the present disclosure, processing module 202 may comprise at least device 102 that may be, for example, a microprocessor including at least one processor core corresponding to component 110 in FIG. 1. In one operational scenario, external interactor 104A may also reside in processing module 202.

Processing module 202 may be configured to execute various instructions in system 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of system 100' such as, for example, static RAM (SRAM) or Dynamic RAM (DRAM). ROM may include non-volatile (NV) memory modules configured based on BIOS, UEFI, etc. to provide instructions when system 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. Consistent with the present disclosure, memory module 204 is shown external interactor. For the sake of explanation herein, memory module 204 is illustrated as comprising external interactor 104B. Possible interaction between device 102 and external interactors 104A and 104B will be described further below.

Power module 206 may include internal power sources (e.g., a battery, fuel cell, etc.) and/or external power sources (e.g., electromechanical or solar generator, power grid, external fuel cell, etc.), and related circuitry configured to supply system 100' with the power needed to operate. User interface module 208 may include hardware and/or software to allow users to interact with system 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 208 may be incorporated within system 100' and/or may be coupled to system 100' via a wired or wireless communication medium. User interface module 208 may be optional in certain circumstances such as, for example, a situation wherein system 100' is a server (e.g., rack server, blade server, etc.) that does not include user interface module 208, and instead relies on another device (e.g., a management terminal) for user interface functionality.

Communication interface module 210 may be configured to manage packet routing and other control functions for communication module 212, which may include resources configured to support wired and/or wireless communications. In some instances, system 100' may comprise more than one communication module 212 (e.g., including separate physical interface modules for wired protocols and/or wireless radios) managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, device 102 may reside in a module within system 100' such as processing module 202. Given that device 102 is a microprocessor, device 102 may receive signals from external interactor 104A in processing module 202 (e.g., at least one IC in the chipset supporting the microprocessor) or from external interactor 104B in another module such as memory module 204 (e.g., a signal from a memory controller providing data to device 102 for processing). Upon detecting a potential attack, signal delay monitor 112 and/or 120 may indicate the potential attack (e.g., may set a fault bit in device 102). Systemic security 106 may then cause some or all of module 200 to 212 to enter a protective mode. For example, when SGX is being employed processing module may encrypt data and store it in a protected portion of memory module 204. Moreover, resources in processing module 202 may output to user interface module 208 and/or communication-related modules 210/212. For example, user interface module 208 may present an audible, visible or tactile notification, communication interface module 210 may cause communication module 212 to transmit a notification, etc.

Figure 3:
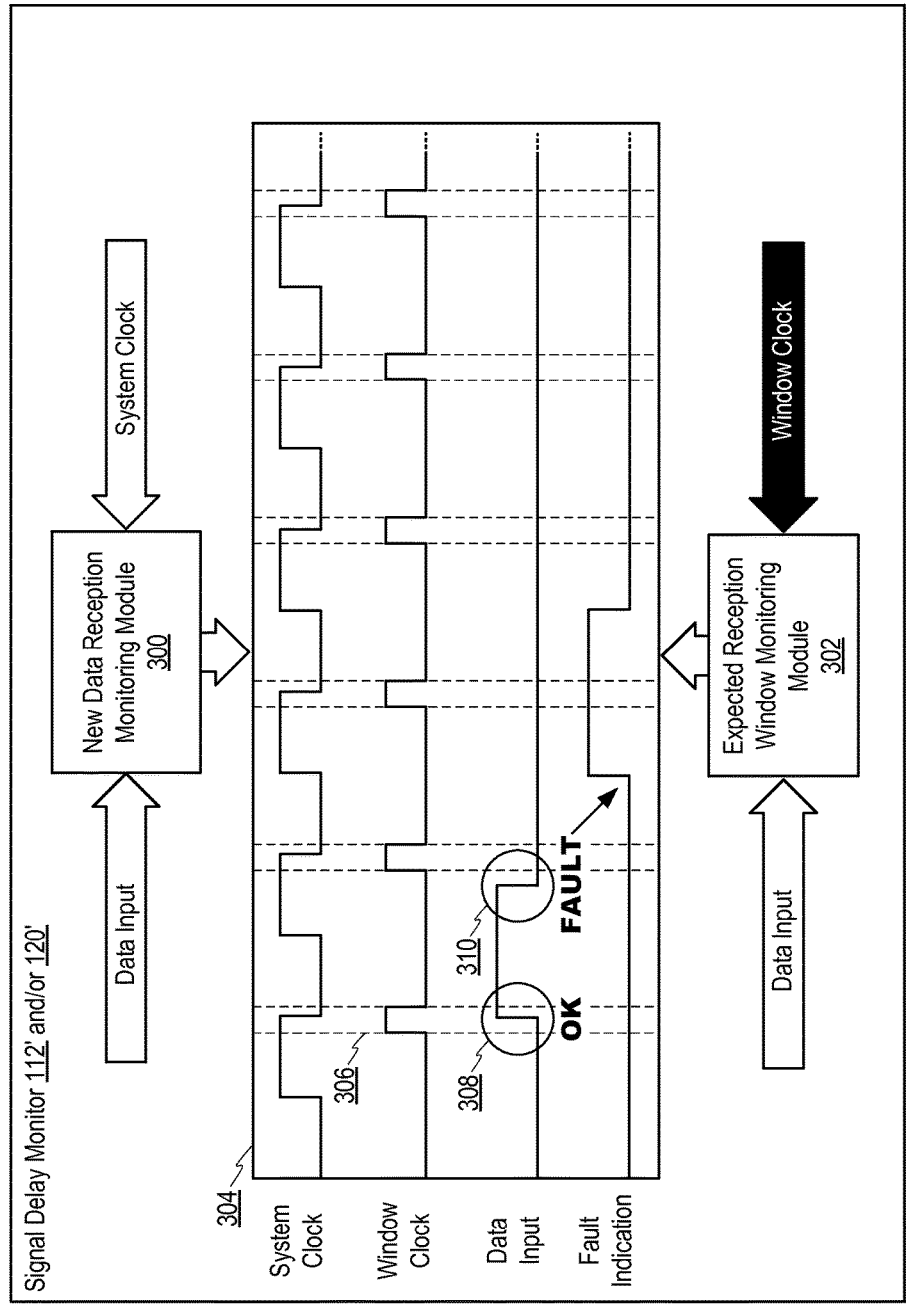
FIG. 3 illustrates examples of signal delay monitor content and operation in accordance with at least one embodiment of the present disclosure.

FIG. 3 illustrates examples of signal delay monitor content and operation in accordance with at least one embodiment of the present disclosure. The examples of signal delay monitor content and operation as shown in FIG. 3 may correspond to signal delay monitor 112 and/or signal delay monitor 120. In at least one embodiment, signal delay monitor 112' and/or 120' may include at least new data reception monitoring module 300 and expected reception window monitoring module 300. New data reception monitoring module 300 may receive a data input (e.g., signals being transmitted to component 110 via physical interface 108) a system clock, and may determine based on these inputs whether new data is being transmitted to device 102. Expected reception window monitoring module 302 may also receive the data input but may instead trigger on a window clock. The window clock may provide clock pulses to expected reception window monitoring module 302, the start and duration of which define an expected reception window. Expected reception window monitoring module 302 may indicate a potential attack when it determines that data has been received outside of the expected reception window.

An example of signal delay monitor operation is disclosed at 304. Four signal patterns are shown including a system clock signal pattern, a window clock signal pattern, a data input signal pattern and a fault indication pattern. The system clock may alternate between high and low on a regular/periodic basis to coordinate logical operation within the system. The window clock may be a pulse clock tuned to form expected reception window 306 when data is expected to be received. The tuned pulse clock may be generated by discrete or programmable circuitry in device 102. The width of the pulse should match the expected dynamic variation of the signal delay. Consistent with the present disclosure, the window clock pulse may potentially be reused across multiple matching I/O ports in physical interface 108. The window clock may be tuned using a variety of structures and/or operations. For example, a tunable delay line may be used to center the pulse at the mean of the delay distribution. To keep the pulse width small and the monitor circuit reliability high, some typical variations may be accounted for utilizing existing techniques. For example, static variations may be measured and factored into the programmable pulse generation logic by adjusting the center and width of the pulse. Some dynamic variations can be accounted for by using active feedback to adjust the pulse dimensions. Ring oscillators, temperature sensors, and other techniques may be used for this purpose. Moreover, some typical system memory types (e.g., DRAM) may comprise tuning and calibration logic built into their physical interface 108. This logic may perform timing training at every power-up to ensure that the eye of the waveform is calibrated properly and the signal is healthy. The calibration logic generates "tap" values that are used to indicate how much of an offset is needed to align the signal properly. The logic used here may implement a similar calibration operation to signal delay monitor 112' and/or 120'. Reuse of the existing tuning logic may allow physical interface 108 to actively monitor signals and determine when significant changes in timing or waveform shape occur, triggering an alert. This could be achieved by generating a valid range of tap values for each signal during nominal operation, and if physical tampering occurs within the memory bus then the tap values would drift outside of the specified range triggering a fault condition.

As shown in FIG. 3, the reception of data may be indicated by a change of state in the data input. At 308 the data input goes from a logical low state to a logical high state, while at 310 the data input drops from the logical high state to the logical low state. The change in state at 308 occurs within an expected reception window, and thus is determined to be received as expected (e.g., "OK"). On the contrary, at 310 the high to low transition occurs outside of an expected reception window (e.g., "FAULT"). As a result, when enabled by the system clock logic in signal delay monitor 112' and/or 120' may indicate a potential attack by causing the fault indication to transition from low to high (e.g., at least until the next low to high system clock transition). In at least one embodiment, the fault indication may be seen by systemic security 106, which may then perform at least one security-related action to protect system 100.

Figure 4:
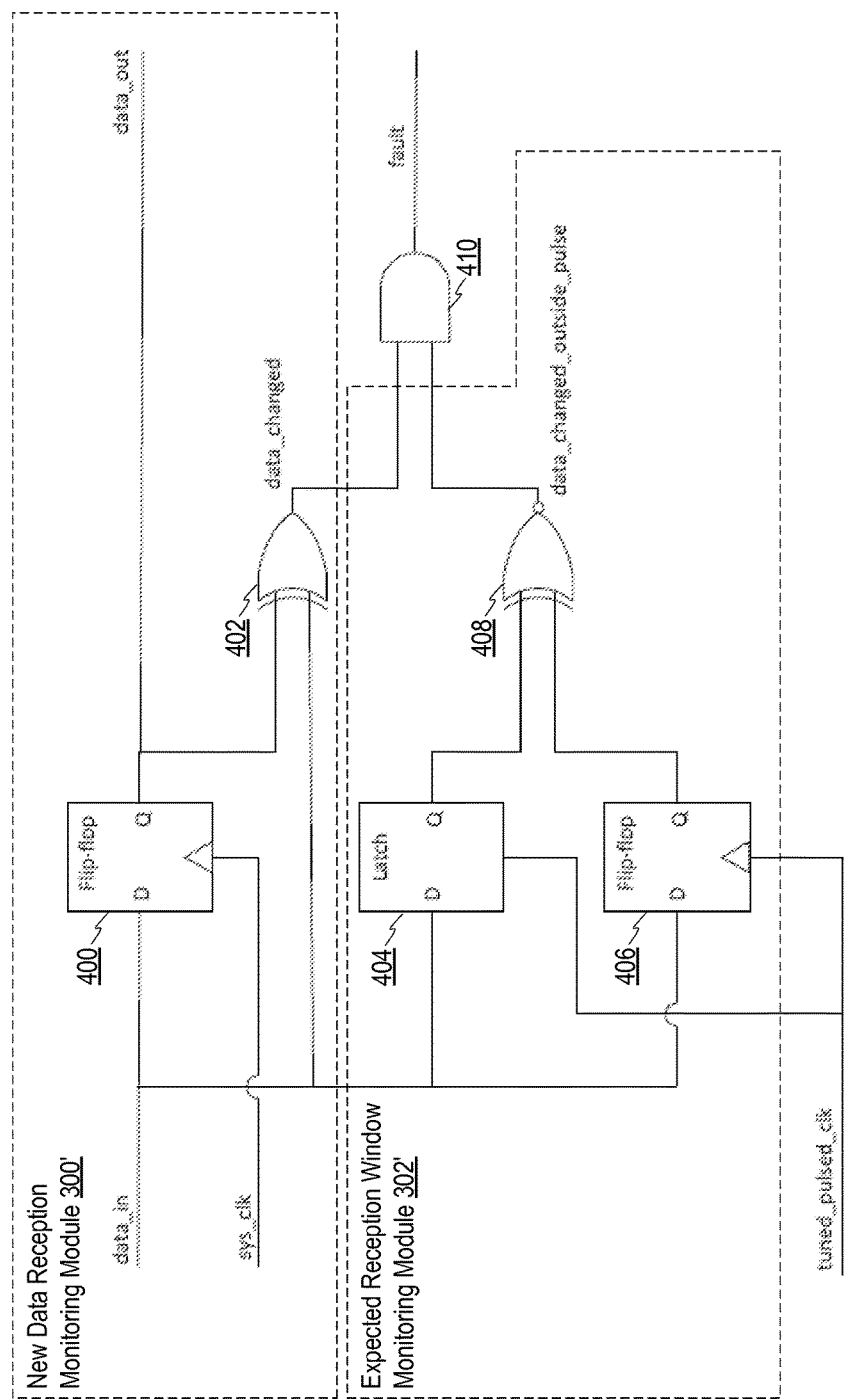
FIG. 4 illustrates an example logical structure for a signal delay monitor in accordance with at least one embodiment of the present disclosure.

FIG. 4 illustrates an example logical structure for a signal delay monitor in accordance with at least one embodiment of the present disclosure. In at least one embodiment, new data reception monitoring module 300' may comprise D flip flop 400 and exclusive OR (XOR) gate 402. Expected reception window monitoring module 302' may comprise D latch 404, D flip-flop 406 and exclusive NOR (XNOR) gate 408. Consistent with the present disclosure, D latch 404 may be a positive phase D latch and D flip-flop 406 may be a positive edge D flip-flop. In an example of operation, D flip-flop 400 may receive new data (e.g., data_in) and may be enabled by the system clock (e.g., sys_clock). When the system clock enables D flip-flop 400, the data value of D may be passed to Q representing the previous state of the data input. The previous state may be compared to the present state of the data input by XOR 402, which may signify that the signal at the data input changed by outputting a high logical signal (e.g., "1") if the previous data input value and current data input value are different, (e.g., data_changed=1). Otherwise, the output of XOR 402 may remain low (e.g., data_changed=0), preventing the logic in expected reception window monitoring module 302' from falsely triggering an indication.

The current data input may also be fed to D latch 404 and D flip-flop 406. Both logical elements 404 and 406 may trigger based on the window clock (e.g., tuned_pulse_clock). D latch 404 may pass data_in through to Q immediately when enabled and then holds Q. In an example of operation, logical elements 404 and 406 will both recognize the state change of the data input when the signal changes before the window clock pulse, and will both miss the state change of data_in if it occurs after the window clock pulse. In either instance the value of logical elements 404 and 406 will be the same, which may then cause XNOR 408 to output a logical high signal (e.g., data_changed_outside_pulse=1). If the data_in changes within the expected reception window (e.g., when tuned_pulse_clock is high), only D latch 404 will catch it since the value of Q in D flip-flop 406 is the previous state of D. The values output by logical elements 404 and 406 will be different, causing XNOR 408 to output a logical low signal indicating that the signal at the data input was received as expected (e.g., data_changed_outside_pulse=0). AND gate 410 may then AND together the logical outputs of new data reception monitoring module 300' and expected reception window monitoring module 302'. If module 300' and 302' indicate that both new data was received and that the signal was received outside of the expected reception window (e.g., both outputs are "1") then AND gate 410 may indicate a fault (e.g. fault=1). In at least one embodiment, systemic security 106 may monitor the fault output, and after determining that the fault output is high (e.g., fault=1) may perform at least one security action.

Figure 5:
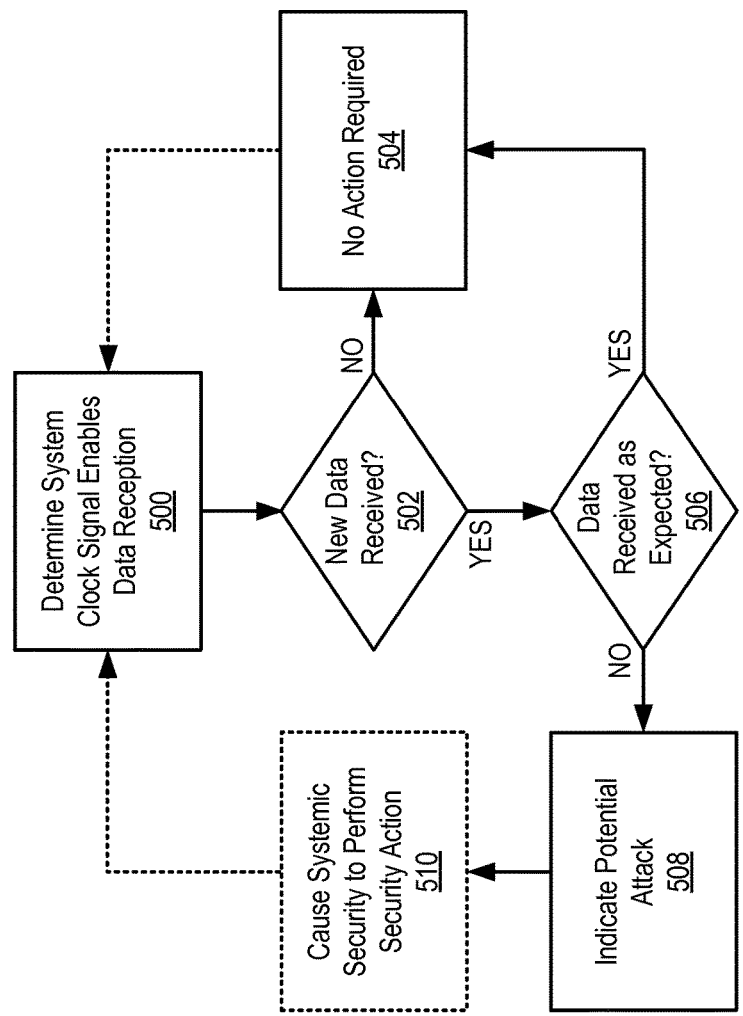
FIG. 5 illustrates example operations for attack detection through signal delay monitoring in accordance with at least one embodiment of the present disclosure.

FIG. 5 illustrates example operations for attack detection through signal delay monitoring in accordance with at least one embodiment of the present disclosure. In operation 500 it may be determined that the system clock has enabled data reception in a device (e.g., the system clock has transitioned from low to high). A determination may then be made in operation 502 as to whether new data has been received (e.g., at a physical interface in the device). If in operation 502 it is determined that new data has not been received, then in operation 504 no action may be required. Operation 504 may optionally be followed by a return to operation 500 in preparation for the system clock to again enable data reception in the device.

If in operation 502 it is determined that new data has been received, then in operation 506 a determination may be made as to whether the data was received as expected. For example, the data may be received as expected if it was received within a window defining a time period in which receipt of the signal is expected. A determination in operation 506 that the data was received as expected may be followed by a return to operation 504 wherein no action is required. If it is determined in operation 506 that the data was not received as expected, then in operation 508 a potential attack may be indicated. The indication of a potential attack may optionally cause systemic security in the device to perform at least one security action in operation 510. Operation 510 may optionally be followed by a return to operation 500 in preparation for the system clock to again enable data reception in the device.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to attack detection through signal delay monitoring. An example system may comprise at least one device including a physical interface. At least one signal delay monitor may determine whether a signal being transmitted to the device is received as expected at the physical interface and indicate a potential attack when the signal is determined to not be received as expected. Determining whether the signal is received as expected may include determining whether the signal is received within a window defining a time period in which receipt of the signal is expected. An example signal monitor may comprise at least a new data reception monitoring module and an expected reception window monitoring module. These modules may include logic to determine whether the signal is received within the window. An indication of a potential attack may trigger, for example, security-related actions in the system.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for attack detection through signal delay monitoring.

According to example 1 there is provided a device equipped for attack detection through signal delay monitoring. The device may comprise a physical interface, at least one signal delay monitor included in, or at least coupled to, the physical interface, wherein the at least one signal monitor is to determine whether a signal being transmitted to the device is received as expected at the physical interface and indicate a potential attack when the signal is determined to not be received as expected.

Example 2 may include the elements of example 1, wherein in determining whether the signal is received as expected the signal monitor is to determine whether the signal is received within a window defining a time period in which receipt of the signal is expected.

Example 3 may include the elements of example 2, wherein the at least one signal delay monitor comprises at least a new data reception monitoring module including logic enabled by a system clock to compare a state of a data input in the physical interface to a previous state of the data input to determine if new data has been received at the data input and an expected reception window monitoring module including logic enabled by a window clock to determine if the state of the data input changes during the expected reception window.

Example 4 may include the elements of any of examples 2 to 3, wherein the at least one signal delay monitor comprises at least a new data reception monitoring module and an expected reception window monitoring module.

Example 5 may include the elements of example 4, wherein the new data reception module comprises logic enabled by a system clock to compare a state of a data input in the physical interface to a previous state of the data input to determine if new data has been received at the data input.

Example 6 may include the elements of example 5, wherein the logic in the new data reception module comprises at least a D flip-flop and an exclusive OR (XOR) gate.

Example 7 may include the elements of any of examples 5 to 6, wherein the expected reception window monitoring module comprises logic enabled by a window clock to determine if the state of the data input changes during the expected reception window.

Example 8 may include the elements of example 7, wherein the logic in the expected reception window monitoring module comprises at least a D Latch, a D flip-flop and an exclusive NOR (XNOR) gate.

Example 9 may include the elements of example 8, wherein in the expected reception window monitoring module the D Latch is a positive phase D latch and the D flip-flop is a positive edge D flip-flop.

Example 10 may include the elements of any of examples 7 to 9, wherein the expected reception window is determined based on the window clock.

Example 11 may include the elements of any of examples 7 to 10, wherein the window clock is a tuned pulse clock.

Example 12 may include the elements of any of examples 7 to 11, wherein in indicating a potential attack the signal monitor is to set a fault bit based on logic that performs a logical AND on an output of the new data reception monitoring module and an output of the expected reception window monitoring module.

Example 13 may include the elements of any of examples 1 to 12, further comprising at least one internal signal delay monitor to determine whether a signal being transmitted within the device is received as expected in the device, and indicate a potential attack when the signal is not received as expected.

Example 14 may include the elements of any of examples 1 to 13, wherein the device is a microprocessor.

According to example 15 there is provided a system equipped for attack detection through signal delay monitoring. The system may comprise at least one device including a physical interface and at least one signal delay monitor included in, or at least coupled to, the physical interface, wherein the at least one signal monitor is to determine whether a signal being transmitted to the device is received as expected at the physical interface, and indicate a potential attack when the signal is not received as expected, at least one interactor external to the at least one device to transmit the signal and systemic security to at least monitor for the at least one signal delay monitor to indicate a potential attack.

Example 16 may include the elements of example 15, wherein in determining whether the signal is received as expected the signal monitor is to determine whether the signal is received within a window defining a time period in which receipt of the signal is expected.

Example 17 may include the elements of any of examples 15 to 16, wherein the signal monitor comprises at least a new data reception monitoring module and an expected reception window monitoring module.

Example 18 may include the elements of any of examples 15 to 17, wherein the systemic security is at least one of software-based virus protection, a firewall or hardware-based memory protection.

Example 19 may include the elements of any of examples 15 to 18, wherein the systemic security is to perform at least one security-related action based on determining that the signal monitor has indicated a potential attack.

Example 20 may include the elements of example 19, wherein the at least one security-related action comprises at least one of discontinuing operation of at least a portion of the system, encrypting data in the system or generating at least one notification of the potential attack.

According to example 21 there is provided a method for attack detection through signal delay monitoring. The method may comprise determining that a state of a system clock enables the reception of data in a device, determining at a physical interface in the device whether new data is received and determining in at least one signal delay monitor included in, or at least coupled to, the physical interface whether the new data is received as expected based on a determination that new data is received at the device.

Example 22 may include the elements of example 21, wherein determining whether new data is received at the device comprises comparing a state of a data input in the device to a previous state of the data input in the device.

Example 23 may include the elements of any of examples 21 to 22, wherein determining whether the new data is received as expected comprises determining whether the signal is received within a window defining a time period in which receipt of the signal is expected.

Example 24 may include the elements of any of examples 21 to 23, wherein determining whether the new data is received as expected comprises performing a logical AND on an output of the new data reception monitoring module in the at least one signal delay monitor and an output of the expected reception window monitoring module in the at least one signal delay monitor.

Example 25 may include the elements of any of examples 21 to 24, and may further comprise indicating a potential attack when the signal is determined to not be received as expected.

Example 26 may include the elements of example 25, and may further comprise causing systemic security in a system in which the device is incorporated to perform at least one security-related action based on indicating a potential attack.

Example 27 may include the elements of example 26, wherein performing at least one security-related action comprises at least one of discontinuing operation of at least a portion of the system, encrypting data in the system or generating at least one notification of the potential attack.

Example 28 may include the elements of any of examples 21 to 27, and may further comprise indicating a potential attack when the signal is determined to not be received as expected and causing systemic security in a system in which the device is incorporated to perform at least one security-related action based on indicating a potential attack.

According to example 29 there is provided a system including at least a device, the system being arranged to perform the method of any of the above examples 21 to 28.

According to example 30 there is provided a chipset arranged to perform the method of any of the above examples 21 to 28.

According to example 31 there is provided at least one machine readable medium comprising a plurality of instructions that, in response to be being executed on a computing device, cause the computing device to carry out the method according to any of the above examples 21 to 28.

According to example 32 there is provided a device configured for attack detection through signal delay monitoring, the device being arranged to perform the method of any of the above examples 21 to 28.

According to example 33 there is provided a system for attack detection through signal delay monitoring. The system may comprise means for determining that a state of a system clock enables the reception of data in a device, means for determining at a physical interface in the device whether new data is received and means for determining in at least one signal delay monitor included in, or at least coupled to, the physical interface whether the new data is received as expected based on a determination that new data is received at the device.

Example 34 may include the elements of example 33, wherein the means for determining whether new data is received at the device comprise means for comparing a state of a data input in the device to a previous state of the data input in the device.

Example 35 may include the elements of any of examples 33 to 34, wherein the means for determining whether the new data is received as expected comprise means for determining whether the signal is received within a window defining a time period in which receipt of the signal is expected.

Example 36 may include the elements of any of examples 33 to 35, wherein the means for determining whether the new data is received as expected comprise means for performing a logical AND on an output of the new data reception monitoring module in the at least one signal delay monitor and an output of the expected reception window monitoring module in the at least one signal delay monitor.

Example 37 may include the elements of any of examples 33 to 36, and may further comprise means for indicating a potential attack when the signal is determined to not be received as expected.

Example 38 may include the elements of example 37, and may further comprise means for causing systemic security in a system in which the device is incorporated to perform at least one security-related action based on indicating a potential attack.

Example 39 may include the elements of example 38, wherein the means for performing at least one security-related action comprise means for at least one of discontinuing operation of at least a portion of the system, encrypting data in the system or generating at least one notification of the potential attack.

Example 40 may include the elements of any of examples 33 to 39, and may further comprise means for indicating a potential attack when the signal is determined to not be received as expected and means for causing systemic security in a system in which the device is incorporated to perform at least one security-related action based on indicating a potential attack.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device equipped for attack detection through signal delay monitoring, comprising:
   a physical interface comprising at least one of pins, pads or contacts;
   a component to process signals;
   a plurality of signal delay monitors, wherein at least one signal delay monitor in the plurality of signal delay monitors is coupled to each of the at least one of pin, pad or contacts in the physical interface, wherein the at least one signal delay monitor is to determine whether a signal originating outside of the device to be processed by the component is received within a window defining a time period in which receipt of the signal is expected at the physical interface and indicate a potential attack when the signal is determined to not be received as expected;
   wherein the at least one signal delay monitor includes:
      new data reception monitoring circuitry that includes logic enabled by a system clock to compare a state of data inputs corresponding to each of the at least one pin, pad or contact in the physical interface to at least one previous state of the data input to determine if new data has been received at the data input; and
      expected reception window monitoring circuitry that includes logic enabled by a window clock to determine if the state of the at least one data input changes during the expected reception window, wherein the window clock comprises a tunable delay line and in indicating a potential attack the signal delay monitor is to set a fault bit based on logic that performs a logical AND on an output of the new data reception monitoring circuitry and an output of the expected reception window monitoring circuitry.

2. The device of claim 1, wherein the expected reception window is determined based on the window clock.

3. The device of claim 1, wherein the window clock is a tuned pulse clock.

4. The device of claim 1, further comprising at least one internal signal delay monitor to determine whether a signal being transmitted within the device is received as expected in the device, and indicate a potential attack when the signal is not received as expected.

5. A system equipped for attack detection through signal delay monitoring, comprising:
   at least one device including a physical interface comprising at least one of pins, pads or contacts, a component to process signals and a plurality of signal delay monitors coupled to each of the at least one of pin, pad or contacts in the physical interface, wherein at least one signal monitor in the plurality of signal delay monitors is to determine whether a signal originating outside of the at least one device to be processed by the component is received within a window defining a time period in which receipt of the signal is expected at the physical interface, and indicate a potential attack when the signal is not received as expected;
   wherein the at least one signal delay monitor includes:
      new data reception monitoring circuitry that includes logic enabled by a system clock to compare a state of data inputs corresponding to each of the at least one pin, pad or contact in the physical interface to at least one previous state of the data input to determine if new data has been received at the data input; and
      expected reception window monitoring circuitry that includes logic enabled by a window clock to determine if the state of the at least one data input changes during the expected reception window, wherein the window clock comprises a tunable delay line and in indicating a potential attack the signal delay monitor is to set a fault bit based on logic that performs a logical AND on an output of the new data reception monitoring circuitry and an output of the expected reception window monitoring circuitry;
   at least one interactor external to the at least one device to transmit the signal; and
   systemic security to at least monitor for the at least one signal delay monitor to indicate a potential attack.

6. The system of claim 5, wherein the systemic security is to perform at least one security-related action based on determining that the signal monitor has indicated a potential attack.

7. A method for attack detection through signal delay monitoring, comprising:
   determining that a state of a system clock enables the reception of data in a device;
   determining at a physical interface comprising at least one of pins, pads or contacts in the device whether new data is received from outside of the device for processing by a component within the device;
   comparing, by new data reception monitoring circuitry that includes logic enabled by a system clock, states of the new data corresponding to each of the at least one pin, pad or contact received at the physical interface to at least one previous state of a new data input;
   determining, by expected reception window monitoring circuitry that includes logic enabled by a window clock comprising a tunable delay line, if the state of the at least one new data input changes during the expected reception window; and
   indicating a potential attack by setting a fault bit based on logic that performs a logical AND on an output of the new data reception monitoring circuitry and an output of the expected reception window monitoring circuitry.

8. The method of claim 7, further comprising:
   indicating a potential attack when the signal is determined to not be received as expected.

9. The method of claim 8, further comprising:
causing systemic security in a system in which the device is incorporated to perform at least one security-related action based on indicating a potential attack.

10. A non-transitory machine-readable storage medium having stored thereon, individually or in combination, instructions for attack detection through signal delay monitoring that, when executed by one or more processors, cause the one or more processors to:
determine that a state of a system clock enables the reception of data in a device;
determine at a physical interface comprising at least one of pins, pads or contacts in the device whether new data is received from outside of the device for processing by a component within the device; and
compare, by new data reception monitoring circuitry that includes logic enabled by a system clock, states of the new data corresponding to each of the at least one pin, pad or contact received at the physical interface to at least one previous state of a new data input;
determine, by expected reception window monitoring circuitry that includes logic enabled by a window clock comprising a tunable delay line, if the state of the at least one new data input changes during the expected reception window; and
indicate a potential attack by setting a fault bit based on logic that performs a logical AND on an output of the new data reception monitoring circuitry and an output of the expected reception window monitoring circuitry.

11. The non-transitory storage medium of claim 10, further comprising instructions that, when executed by one or more processors, cause the one or more processors to:
indicate a potential attack when the signal is determined to not be received as expected.

12. The non-transitory storage medium of claim 11, further comprising instructions that, when executed by one or more processors, cause the one or more processors to:
cause systemic security in a system in which the device is incorporated to perform at least one security-related action based on indicating a potential attack.

* * * * *